March 10, 1959  J. E. DUBE ET AL  2,876,629
CONTROL FOR TEMPERATURE CHANGING DEVICE
Filed July 30, 1954
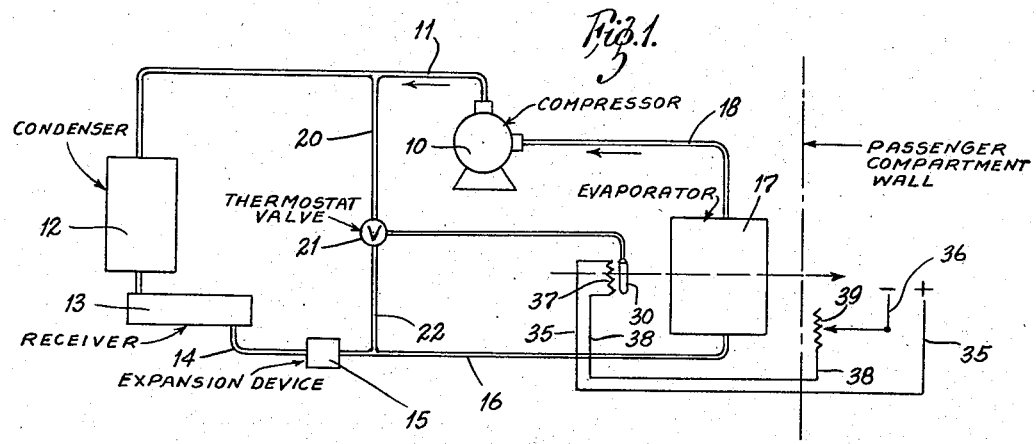
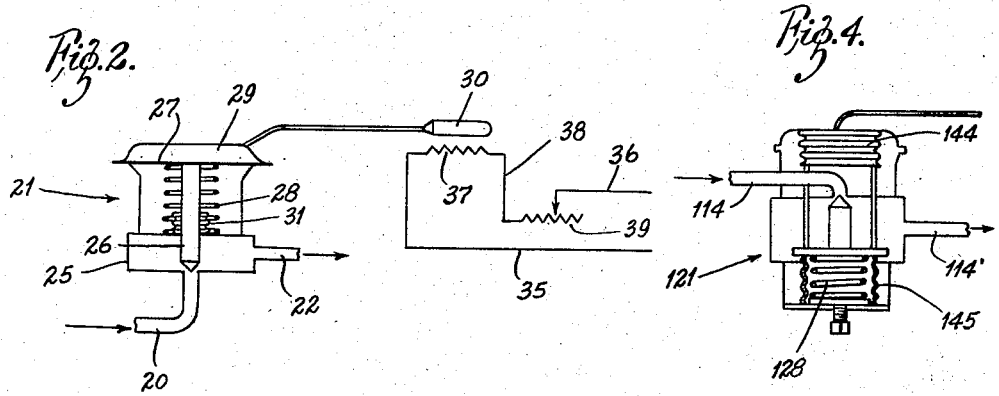
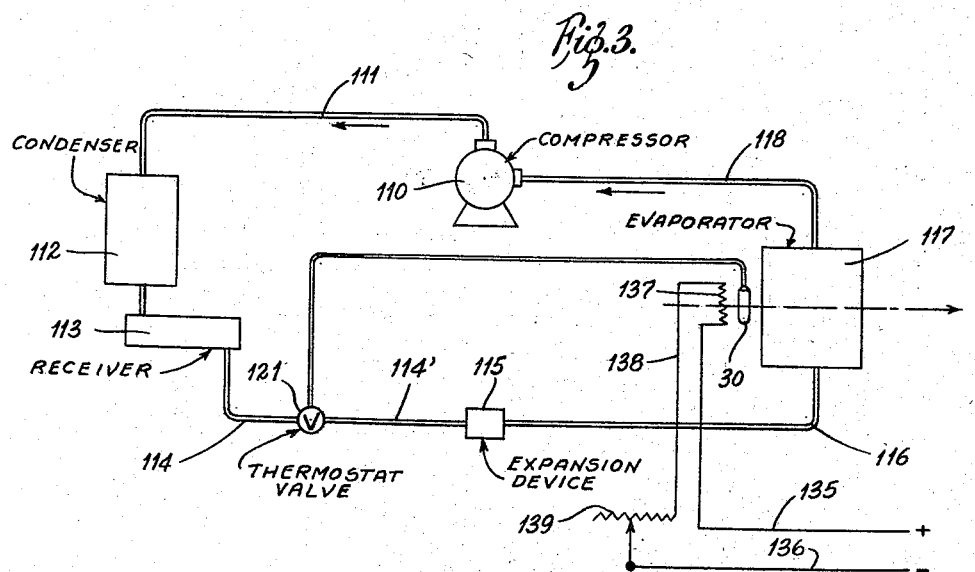
INVENTORS:
JOHN E. DUBE,
RALPH B. TILNEY,
BY Kingsland, Rogers & Ezell
ATTORNEYS United States Patent Office 2,876,629
Patented Mar. 10, 1959

2,876,629

CONTROL FOR TEMPERATURE CHANGING DEVICE

John E. Dube, Chesterfield, and Ralph B. Tilney, Clayton, Mo., assignors to Alco Valve Company, St. Louis, Mo., a corporation of Missouri Application July 30, 1954, Serial No. 446,775

5 Claims. (Cl. 62—117)

The present invention relates to a control for a temperature changing device. It may be particularly applied to an air conditioner for use where the compressor speed varies, and where the control must be remote from the operating parts of the machinery, as on automobiles, although it will be understood that such description is not limiting of its use.

It has heretofore been proposed that some of the problems of control of air conditioners subject to wide variation of compressor speed unrelated to refrigeration requirements, can be overcome by providing a control bypass from the hot gas side of the condenser to the evaporator line, such bypass thereby short-circuiting the condenser (and the receiver if one is used). This functions not only to reduce the capacity of the system, but also to introduce hot gas into the evaporator to raise the temperature thereof, with the consequent reduction of the cooling capacity of the evaporator with respect to the air blown across it. However, such a short-circuiting device requires some sort of a valve in the short-circuit tubing leading from the compressor to the evaporator, and the problem of adjustment of this valve is a difficult one. It may be that under certain operational circumstances the valve should bypass one proportion of the hot gas, thereby reducing the cooling or refrigeration capacity of the system so that the air temperature will reach only a certain low degree, whereas under other circumstances that same setting might make the enclosure uncomfortable. While it is not difficult to make the valve adjustable as to its temperature response, it is difficult to provide such adjustment at a convenient location.

The present invention deals immediately with the matter of adjustment of the thermostatically operated bypass control valve. It is directed toward providing an adjustment that may be conveniently located, and yet may act remotely from the point of control without requiring awkward, inconvenient, hazardous or difficult connections between the point of control and the thermostatically operated valve.

In another sense, the invention consists in providing a thermostatic valve to adjust the flow of a fluid in a fluid-conditioning system in response to the conditioning effect thereof, and providing a remotely controllable artificial heat-change producer to act upon the heat-responsive element of the valve, which heat-change producer is adapted to remote adjustment by convenient means. Specifically, the fluid-conditioning system may be a refrigeration system, and the heat-change producer may be an electrically operated heater, such that remote adjustment by electrical means may regulate an amount of biasing heat applied to the thermal bulb of the valve. And yet more specifically, the foregoing valve may be applied to the piping between the condenser and evaporator, which may be called the expansion device piping, to throttle or to free that line and thereby regulate the flow of refrigerant. But most desirably, it will be applied to a condenser bypass arrangement as previously described.

With the foregoing in mind, and with other objects to appear as the description proceeds, a detailed explanation follows:

In the drawings:

Figure 1 is a schematic diagram of a refrigeration system incorporating the present invention;

Figure 2 is a schematic view of a thermostatically operated valve embodying the present invention;

Figure 3 is a diagrammatic view of a modified arrangement; and

Figure 4 is a diagrammatic view of a valve for use in the assembly of Figure 3.

Referring to Figure 1, a typical refrigeration system is shown as including a compressor 10 delivering to a pipe 11 that opens into a condenser 12. The other end of the condenser may connect into a receiver 13. This receiver delivers to a pipe 14 that connects into an expansion device 15. This device 15 may consist of an expansion valve of the constant superheat type, or other similar valve, or it may consist of a capillary tube or other similar static means which acts to reduce the pressure in the refrigerant. The expansion valve delivers into a pipe 16 that enters an evaporator 17. The evaporator 17 delivers to a pipe 18 leading back to the compressor.

The foregoing is a conventional refrigeration system. In the present arrangement, a pipe 20 is opened into the pipe 11 on the hot gas side of the compressor 10. The pipe 20 leads to a thermostatically controlled valve 21. The other side of the valve 21 is connected by a pipe 22 into the pipe 16 downstream of the expansion valve.

The thermostatic valve 21 is diagrammed in Figure 2. It has a housing 25 into which the pipe 20 leads and from which the pipe 22 leads. A valve seat between these two is controlled by a valve 26 that is regulated by a diaphragm 27 and a spring 28. The diaphragm is operated by the pressure within a diaphragm chamber 29 and a bulb system 30. As shown in Figure 1, the bulb 30 is normally located in the air stream across the evaporator so as to reflect the temperature of the air being conditioned. Normally, it is preferable to have the bulb 30 ahead of the evaporator so that it reflects the temperature of the unrefrigerated air. As the temperature goes up, the valve 21 is throttled and may be closed entirely. A bellows 31 may be used to seal off the flow passages of the valve from the diaphragm.

The present invention contemplates the use of a heater to influence the temperature of the bulb 30. An electric heater has been illustrated because facility of control of the heater is of the essence of this invention. There are a pair of electric power lines 35 and 36 connected to a suitable source of alternating or direct current. The power line 35 leads to a biasing heater 37 located so as to influence the temperature of the bulb 30. From the heater 37, a wire 38 leads to a suitable rheostat 39 or equivalent adjustable impedance, the other side of which is connected to the power line 36.

*Operation*

The normal operation of a refrigeration system of this kind involves the functioning of the compressor 10 to deliver hot gas to the line 11 and the condenser 12. At the condenser 12, its temperature is reduced and the hot gas is liquefied. It may be then delivered to the receiver 13 where a receiver is used, and thence to the pipe 14 leading to the expansion device 15. From it, the cold liquid-gas mixture is delivered by the pipe 16 into the evaporator 17 where it evaporates so as to extract heat of vaporization from ambient atmosphere. From the evaporator, the suction line 18 leads back into the compressor.

Air is drawn by a suitable blower or the like (not shown) across the evaporator in the direction of the arrow in Figure 1. It is cooled by heat exchange across the evaporator.

It will be understood that ordinarily various controls are used to regulate this type of refrigeration system, but they are omitted from the present disclosure for simplicity of description.

The pipe 20 is capable of drawing off hot gas from the hot gas line 11 to deliver it to the system ahead of the evaporator 17, thereby to reduce the refrigeration capacity of the evaporator without stopping the compressor. Where a refrigeration system is used on an automobile with a constantly driven compressor, it is necessary that there be some arrangement to change the refrigeration capacity of the system to prevent overcooling or overheating. The thermostatic valve 21 is caused to open as the temperature of the air flowing to the evaporator 17 falls. Consequently, if the operating conditions are such that relatively cold air is being delivered to the evaporator for additional refrigeration, the air in the space being cooled soon can become uncomfortably cold. However, owing to the fact that this relatively cold air reduces the temperature of the bulb 30, the valve 21 is caused to open to a corresponding degree, bypassing a certain amount of hot gas. With the preferred connection to the line 22, the hot gas is bypassed from the hot gas line 11 directly into the evaporator 17, thereby reducing the cooling capacity of the evaporator and raising its temperature.

Conversely, if the air or other fluid approaching the evaporator is unduly warm, the bulb 30 will respond, causing the valve 21 to throttle the bypass line to a greater extent, reducing the diversion of refrigerant and increasing the refrigeration capacity of the system. The foregoing arrangement may be set so that the system is caused to maintain a certain temperature within the space being refrigerated. However, in many installations, and especially in automobiles, the problem of varying the temperature of the space poses difficulties, because for practical purposes there must be some means of adjustment convenient to the operator of the vehicle. Conventionally, the force of the spring 28 in the valve 21 may be regulated, but this valve is likely to be in the rear deck or under the hood of the automobile. Consequently, the valve 21 is normally inaccessible for such adjustment. Even if the valve be brought to an accessible place, the arrangement is not desirable because in order to bring the valve to the driving compartment it is necessary to have extensive piping.

It has been assumed that the bulb 30 responds to actual temperature of the fluid medium being conditioned. Such is not necessary and here is not true. The bulb need only respond to variations up or down from a datum temperature, which changes correspond to changes in the inflowing fluid. With the present invention, an artificial temperature is produced at the bulb 30, consisting of the resultant of the heat of the flowing fluid and an imposed biasing heat produced by the heater 37.

The system without any biasing heat will maintain the maximum temperature for which it may be set. As the rheostat 39 is adjusted to increase the biasing heat, the temperature maintained descends, until when maximum biasing heat is supplied the minimum temperature which the system is capable of maintaining is established.

In many installations, the air-conditioning equipment is usually located remotely from the point where adjustment is to be made. The rheostat of this invention can be located at any convenient place. Then, if the space being refrigerated be uncomfortably cold the operator will adjust the rheostat 39 to increase the resistance thereof and decrease the heat produced by the biasing heater 37. Thereupon the bulb 30 will act as if the air were colder and will open the valve 21 to a greater degree and reduce the refrigeration capacity of the system, causing the air to be delivered to the car in warmer condition. Similarly, if the air be too warm for comfort, the operator will adjust the rheostat 39 to introduce less resistance, thereby increasing the heat generated by the biasing heater 37, causing the bulb 30 to act as if the returning air entering the evaporator were too warm and required a greater degree of refrigeration. It would, therefore, cause the valve 21 to throttle more, reducing the bypass of hot gas and increasing the refrigeration capacity of the system, and causing the air to be delivered to the car in colder condition.

It can be seen from the foregoing that the present system provides a convenient means of control of an air conditioning arrangement. It is especially convenient for use in automobiles and is especially adapted for use with air refrigeration.

*Modification of Figures 3 and 4*

In Figure 3, the same basic refrigeration system is shown, but with a modification of the temperature adjustment control. The system includes a compressor 110 feeding into a line 111 leading to a condenser 112 and a receiver 113. The receiver is connected by a pipe 114 to a valve 121, and thence to the expansion device 115. The expansion device leads by a pipe 116 to the evaporator 117 which, in turn, is connected by a pipe 118 back into the compressor 110.

In this modification, as noted, the valve 121 is located so that it can throttle the pipe 114 supplying liquid refrigerant to the expansion device 115. Its bulb 130 is located adjacent the evaporator coil 117 and is adapted to be biased by a heater 137 connected with power line 135 and 136 through a wire 138 and rheostat 139.

The arrangement of Figure 3 requires a valve 121 that throttles upon cooling of the bulb 130. Such a valve is diagrammatically illustrated in Figure 4. Increase of the pressure above the bellows 144 in the valve of Figure 4 causes the valve to be moved further away from its seat. Valves of this type are familiar and need not be described in detail. Bellows have been illustrated in place of the single diaphragms, they being known alternatives. Here they are preferred. Note the pressure-balancing lower bellows 145 that offsets the effect of fluid pressures inside the valve, on the main diaphragm or bellows.

*Operation of the modification of Figure 3*

When the air entering the evaporator chamber is excessively warm, thus indicating a need for more refrigeration, this bulb 130 heats and causes the valve 121 to open further, admitting more refrigerant to the expansion device and the evaporator. Conversely, if the air entering the evaporator chamber is already relatively cold, the bulb 130 will cool so that the valve 121 throttles the supply of refrigerant to the expansion device 115 and hence to the evaporator 117, thereby reducing the refrigeration capacity of the system.

This system will be set up so that at a given setting of the rheostat 139 no (or a certain minimum) heat is generated by the biasing heater 137. This will cause the bulb 130 to respond to air temperature, and to throttle or open the valve 121 to maintain the predetermined temperature for which the valve is set by its spring 128. If this be, for instance, 85°, it will represent the highest temperature setting achievable by the present adjustment 139.

Then if the rheostat 139 be adjusted to add heat (such as 3° equivalent) to the bulb 130 by the heater 137, the air temperature will have to descend to 82° so that the resultant temperature on the bulb will be 85°. Hence, the bulb will respond as if the air were overly hot, and will open the valve 121 further to increase the refrigeration capacity until the bulb temperature resulting from more biasing heat and less air heat again reaches its datum temperature assumed at 85°. However, the air temperature at such equilibrium is 82°.

So as the rheostat 139 is adjusted to add heat by the heater 137, the valve 121 is caused to open further to reduce the heat from the heater 130, the valve 121 is caused to throttle and reduce the refrigeration capacity and raise the air temperature.

This invention has been described as applied to a refrigeration cycle of a compressor-condenser-evaporator system. It could be applied to a heating cycle, it being well known that the systems may be reversed.

What is claimed is:

1. In a fluid-conditioning system of the type having a compressor, a condenser heat exchanger, an expansion device, and an evaporator heat exchanger, wherein the speed of the compressor varies without reference to the load requirements on the system; means including a by-pass from the outlet of the compressor to between the heat exchangers and a thermostatic valve adjustable to a plurality of positions to vary the flow of refrigerant in the bypass and hence in at least one of the heat exchangers to vary the fluid-conditioning capacity of the system, a heat-responsive element for the valve located to reflect temperature conditions of the fluid being conditioned and to operate the valve modulatively to cause compensation for variations in such temperature from a predetermined datum temperature; and means to adjust the datum temperature to modulate the temperatures to different values between fully open and fully closed valve positions, comprising a heater to supply biasing heat to the heat-responsive element, conductors to conduct energy to the heater from a remote point, and an energy-varying device in the conductors to vary the amount of energy at will and thereby vary the amount of biasing heat and consequently the datum temperature.

2. The combination of claim 1, wherein the by-pass connects in ahead of the expansion device.

3. The combination of claim 1, wherein the by-pass connects in between the expansion device and the evaporator.

4. In a fluid-conditioning system of the compressor, condenser, expansion device, and evaporator type: a by-pass line from the compressor outlet around the condenser to by-pass the condenser with hot gas; a thermostatically-operated valve in said by-pass line having its heat-responsive element variable with the temperatures of the fluid being conditioned to vary the positions of the valve with such temperatures and thereby maintain a predetermined temperature in that fluid; an electric heater located adjacent the heat-responsive element to apply heat thereto and artificially bias the same; and means to vary potentials supplied to the heater to adjust the biasing heat and consequently to vary the heat capacity of the system.

5. A method of regulating the fluid conditioning capacity of a fluid-conditioning system of the type having refrigerant flowing through a compressor, a condenser heat exchanger, an expansion device, and an evaporator heat exchanger; comprising directing the fluid to be conditioned across the evaporator heat exchanger, modulatively varying the flow of refrigerant through one of the heat exchangers in response to and to accord with changes in temperature of a heat-responsive device; causing fluid being conditioned to apply temperatures corresponding to its temperatures to the heat-responsive device, and thereby causing the heat-responsive device to modulate flow of refrigerant through the evaporator heat exchanger; also producing an artificial heat and applying it to the heat-responsive device; and varying the amount of artificially produced heat to cause the heat-responsive device to adjust the flow of refrigerant in response to the amount of artificially produced heat in addition to the temperature of the fluid being conditioned, the varying of the flow of refrigerant being obtained by bypassing refrigerant around the condenser and regulating flow through the by-pass by the heat-responsive device.

References Cited in the file of this patent

UNITED STATES PATENTS

| | | |
|---|---|---|
| 1,782,651 | Hoffman | Nov. 25, 1930 |
| 2,181,851 | Schlumbohm | Nov. 28, 1939 |
| 2,252,300 | McGrath | Aug. 12, 1941 |
| 2,296,822 | Wolfert | Sept. 22, 1942 |
| 2,498,864 | Root | Feb. 28, 1950 |
| 2,718,763 | Burgess et al. | Sept. 25, 1955 |
| 2,731,805 | Kuhn | Jan. 24, 1956 |
| 2,745,257 | Jacobs | May 15, 1956 |